(12) United States Patent
Kato et al.

(10) Patent No.: US 10,158,821 B2
(45) Date of Patent: Dec. 18, 2018

(54) IMAGING SENSOR AND MOVING BODY

(71) Applicant: CANON KABUSHIKI KAISHA, Tokyo (JP)

(72) Inventors: Taro Kato, Tokyo (JP); Kazuya Igarashi, Tokyo (JP); Takafumi Miki, Tokyo (JP); Akinari Takagi, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 15/445,141

(22) Filed: Feb. 28, 2017

(65) Prior Publication Data

US 2017/0257590 A1 Sep. 7, 2017

(30) Foreign Application Priority Data

Mar. 4, 2016 (JP) .................. 2016-042680

(51) Int. Cl.
*H04N 5/378* (2011.01)
*G02B 3/00* (2006.01)
*B60R 1/00* (2006.01)

(52) U.S. Cl.
CPC .......... *H04N 5/378* (2013.01); *G02B 3/0056* (2013.01); *B60R 1/00* (2013.01); *B60R 2300/8093* (2013.01)

(58) Field of Classification Search
CPC .................. H04N 5/378; G02B 3/0056; B60R 2300/8093; B60R 1/00
See application file for complete search history.

(56) References Cited

U.S. PATENT DOCUMENTS

| | | | |
|---|---|---|---|
| 9,106,858 B2* | 8/2015 | Jin | H04N 5/3745 |
| 2012/0001234 A1* | 1/2012 | Lim | H01L 27/1461 |
| | | | 257/222 |
| 2015/0062102 A1* | 3/2015 | Ikeda | H04N 5/347 |
| | | | 345/207 |
| 2016/0349522 A1* | 12/2016 | Onuki | H04N 5/374 |

FOREIGN PATENT DOCUMENTS

| | | |
|---|---|---|
| JP | 2012-191400 A | 10/2012 |
| JP | 2014-067948 A | 4/2014 |
| JP | 2015-207594 A | 11/2015 |

* cited by examiner

*Primary Examiner* — Padma Haliyur
(74) *Attorney, Agent, or Firm* — Canon U.S.A., Inc. IP Division (57) ABSTRACT

A first photoelectric conversion unit is arranged in one end portion of a pixel, and a second photoelectric conversion unit is arranged in the other end portion of the pixel. A third photoelectric conversion unit is arranged in a center portion of the pixel. A length of the third photoelectric conversion unit in a predetermined direction is shorter than a length of the first photoelectric conversion unit and the second photoelectric conversion unit.

13 Claims, 11 Drawing Sheets

IMAGING SENSOR AND MOVING BODY

BACKGROUND

Field of the Disclosure

The present disclosure generally relates to imaging and, more particularly, to an imaging sensor that can perform distance measurement and a moving body.

Description of the Related Art

In recent years, imaging devices such as a video camera and an electronic still camera have been widely popularized in general public, and charge-coupled devices (CCD), complementary metal-oxide semiconductor (CMOS) image sensors, and the like have been used for these cameras. In addition, focus detection pixels provided with an autofocus (AF) function for automatically performing focus adjustment at the time of imaging have been widely popularized. Japanese Patent Laid-Open No. 2012-191400 describes that focus detection is performed on the basis of a phase difference method by using two or more photoelectric conversion units arranged behind a micro lens. According to this imaging plane phase difference method, a de-ranging amount and a distance to an object are obtained by using trigonometrical ranging principles from a phase difference of parallax images based on light beams that have passed different areas (pupil areas) on a lens pupil.

SUMMARY

An imaging sensor according to one or more aspects of the present disclosure relates to an imaging sensor including a plurality of pixels two-dimensionally arranged on a substrate, a first photoelectric conversion unit arranged in one end portion of a first pixel, a second photoelectric conversion unit that faces the first photoelectric conversion unit in a first direction and that is arranged in the other end portion of the first pixel, and a third photoelectric conversion unit arranged in a center portion of a second pixel, in which a ratio of a length of the third photoelectric conversion unit with respect to a length of the second pixel in a second direction corresponding to a direction orthogonal to the first direction is lower than a ratio of a length of the first photoelectric conversion unit and the second photoelectric conversion unit with respect to a length of the first pixel.

Further features of the present disclosure will become apparent from the following description of exemplary embodiments with reference to the attached drawings.

DESCRIPTION OF THE EMBODIMENTS

Exemplary embodiments for implementing aspects of the present disclosure will be described below with reference to the drawings.

An imaging sensor for an in-vehicle camera is desired in which a depth of field is deepened to avoid blurring over an entirety of a picked-up image while a high ranging accuracy is maintained for a purpose of obtaining information for self-governing movement. However, sufficient study has not been conducted with regard to an element configuration for realizing both a high ranging accuracy and a deep depth of field according to the configuration described in Japanese Patent Laid-Open No. 2012-191400. In view of the above, according to one or more aspects of the present disclosure, an imaging sensor in which the high ranging accuracy and the deep depth of field are both realized as compared with Japanese Patent Laid-Open No. 2012-191400 is provided.

Figure 7:
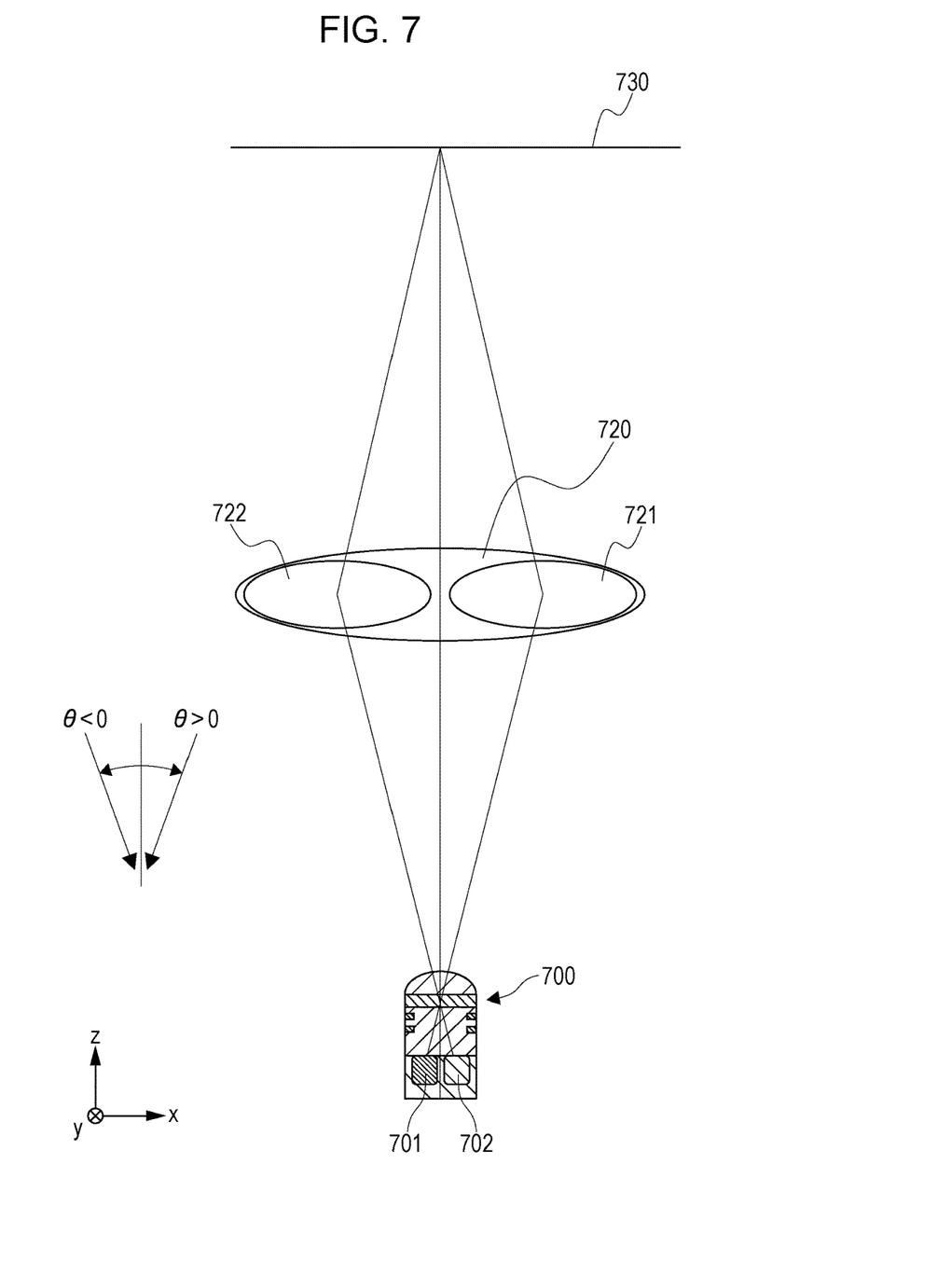
FIG. 7 is an explanatory diagram for describing a related art technology.

FIG. 7 illustrates a ranging pixel 700, an exit pupil 720 of an imaging lens, and an object 730. In FIG. 7, an x direction is set as a pupil division direction, and divided areas of an exit pupil are respectively set as pupil areas 721 and 722. Lights that have passed through the pupil areas 721 and 722 are respectively allocated to be incident on two photoelectric conversion units 701 and 702 to obtain two parallax images, and distance measurement can be performed by using the trigonometrical ranging principles.

Figure 8:
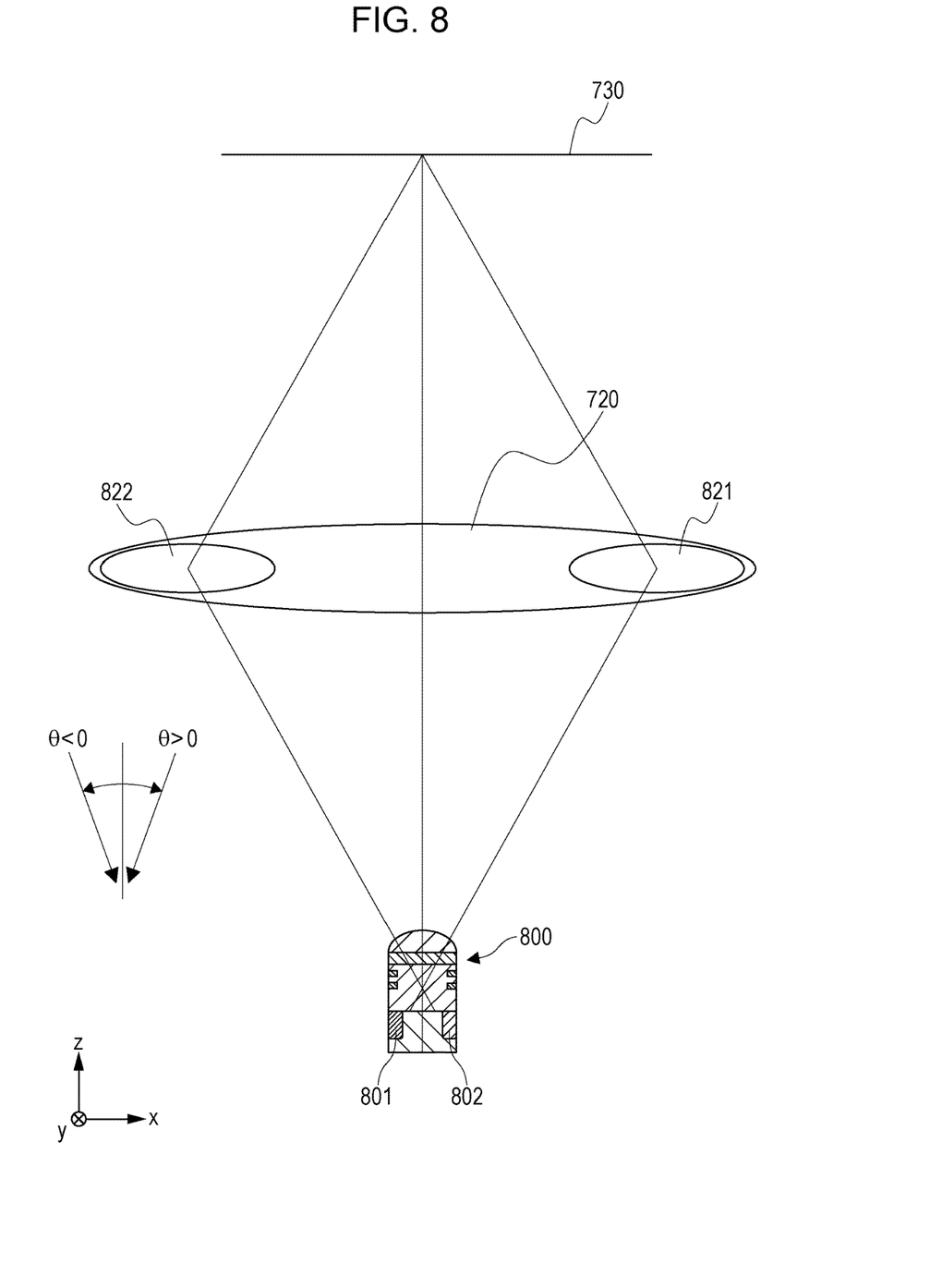
FIG. 8 is an explanatory diagram for describing an exemplary embodiment according to one or more aspects of the present disclosure.

A pixel in which both ranging and imaging can be performed is commonly configured in a manner that an area occupied by both the pupil areas 721 and 722 corresponding to the photoelectric conversion units 701 and 702 becomes equal to a whole pupil area. However, since it is demanded that the parallax is set to be larger from a perspective of the ranging accuracy, a distance between centroids of the pupil areas corresponding to each parallax needs to be lengthened. In view of the above, as illustrated in FIG. 8, according to one or more aspects of the present disclosure, a diaphragm of the lens is opened to set, for example, an open F-number so that the distance between the centroids of the pupil areas 721 and 722 (base line length) is increased.

In addition, the two photoelectric conversion units are respectively arranged in end portions of the pixel to further increase the distance between the centroids of the pupil areas 721 and 722. FIG. 8 illustrates the above-mentioned configuration, and photoelectric conversion units 801 and 802 are arranged in the end portions of the pixel in a state in which the diaphragm of the lens is opened. As a result, a distance between centroids of pupil areas 821 and 822 in FIG. 8 is longer than the distance between the centroids of the pupil areas 721 and 722 in FIG. 7.

Figure 9:
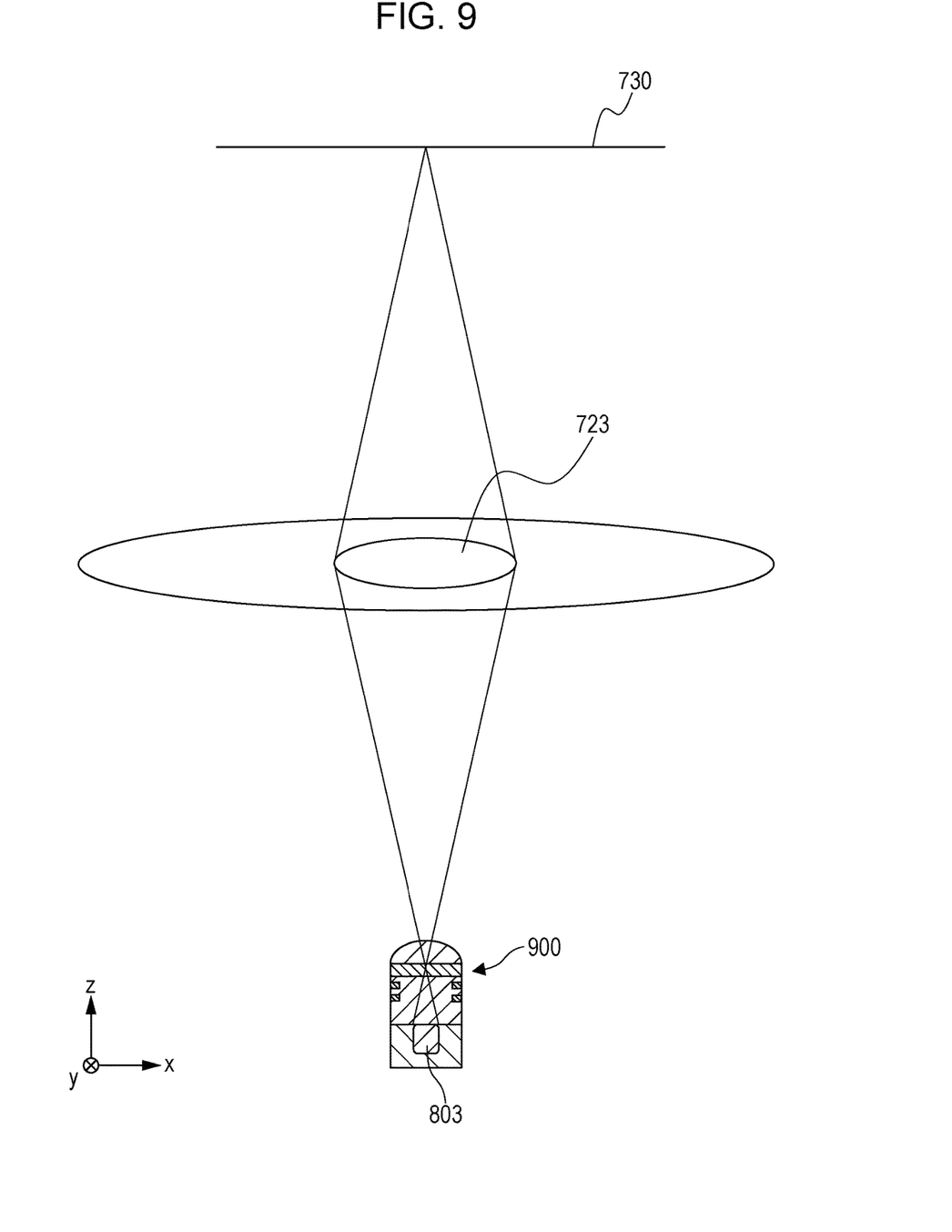
FIG. 9 is an explanatory diagram for describing an exemplary embodiment according to one or more aspects of the present disclosure.

Incidentally, when the diaphragm of the lens is set as the open F-number, for example, the depth of field is shallowed, and it becomes difficult to focus over the whole imaging area. For this reason, the above-described configuration is not appropriate to an in-vehicle imaging sensor in which imaging needs to be performed without blurring from a near end to a far end. In view of the above, according to one or more aspects of the present disclosure, a size of the photoelectric conversion unit is decreased in both the x direction and a y direction in order that the pupil area through which the light beam used for the imaging passes is reduced by being limited in the vicinity of an optical axis. FIG. 9 illustrates the above-described configuration, and an area occupied by a photoelectric conversion unit 803 of an imaging element 900 is decreased, and the photoelectric conversion unit 803 is arranged in the vicinity of the center of the pixel. When the above-described configuration is adopted, it is possible to provide the imaging sensor in which the depth of field is not shallowed even in a case where the diaphragm of the lens is set as the open F-number, for example. That is, it is possible to provide the imaging sensor in which both the high ranging accuracy and the deep depth of field can be achieved. Hereinafter, respective exemplary embodiments will be described.

First Exemplary Embodiment

Overall Configuration of an Imaging Sensor

Figure 1:
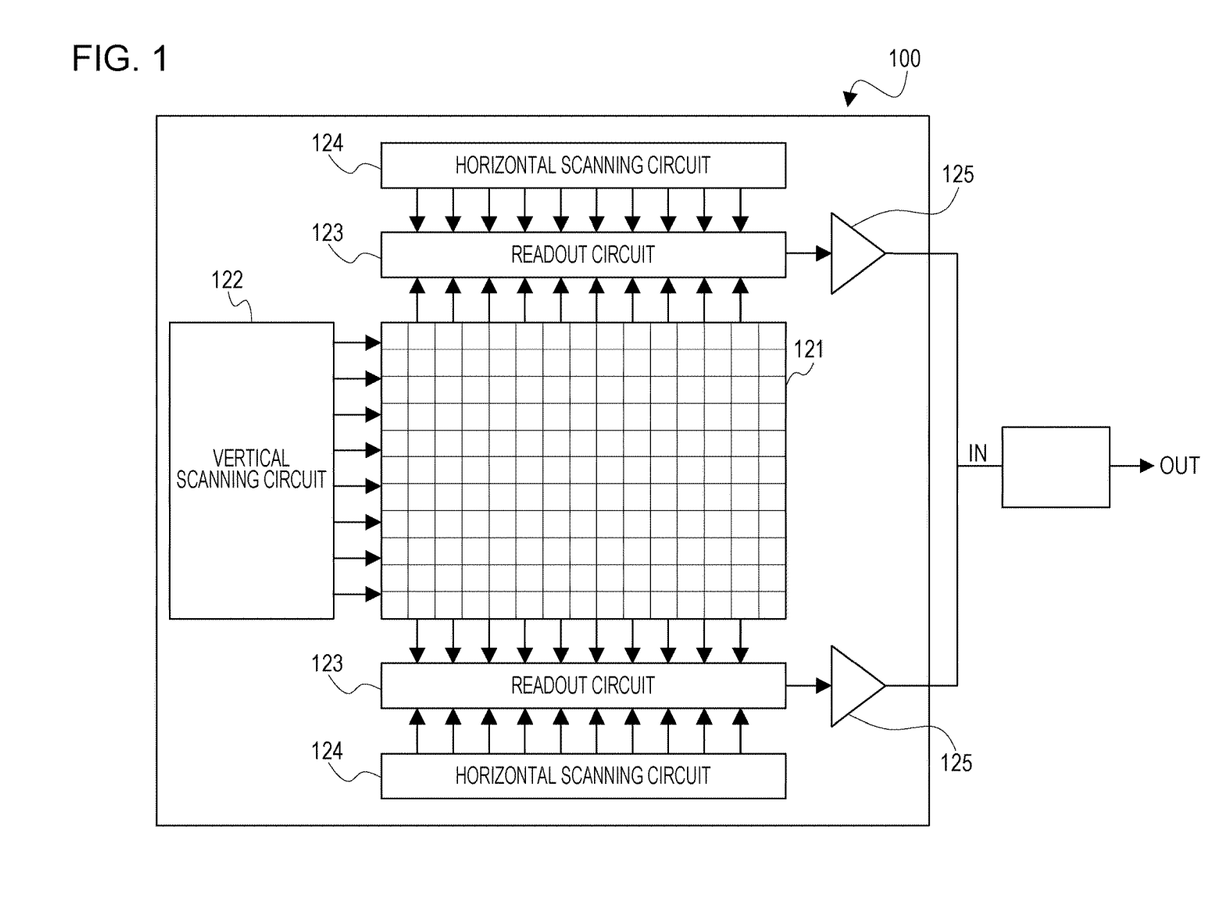
FIG. 1 is an explanatory diagram for describing a first exemplary embodiment according to one or more aspects of the present disclosure.

FIG. 1 is a block diagram of an imaging sensor 100 including ranging pixels and imaging pixels according to one or more aspects of the present disclosure. The imaging sensor 100 is provided with a pixel region 121, a vertical scanning circuit 122, two readout circuits 123, two horizontal scanning circuits 124, and two output amplifiers 125. A region other than the pixel region 121 is a peripheral circuit region. A large number of ranging pixels and imaging pixels are two-dimensionally arranged in the pixel region 121. The readout circuit 123 such as, for example, a column amplifier, a correlated double sampling (CDS) circuit, an adder circuit, or the like is provided in the peripheral circuit region, and amplification, addition, or the like is performed on a signal read out from a pixel in a row selected by the vertical scanning circuit 122 via a vertical signal line. The horizontal scanning circuit 124 generates signals for sequentially reading out signals based on pixel signals from the readout circuit 123. The output amplifier 125 amplifies and outputs a signal in a column selected by the horizontal scanning circuit 124.

Pixel Configuration in Each Pixel

FIGS. 2A to 2D are cross sectional views and plan views of a ranging pixel 800 and the imaging element 900. According to the present exemplary embodiment, a case will be described where an electron is used as a signal charge. An n-type is set as a first conductivity type, and a p-type is set as a second conductivity type, but a hole may be used as the signal charge. In a case where the hole is used as the signal charge, it suffices when conductive types of respective semiconductor regions are set as conductivity types reverse to those in a case where the electron is used as the signal charge.

Figure 2A:
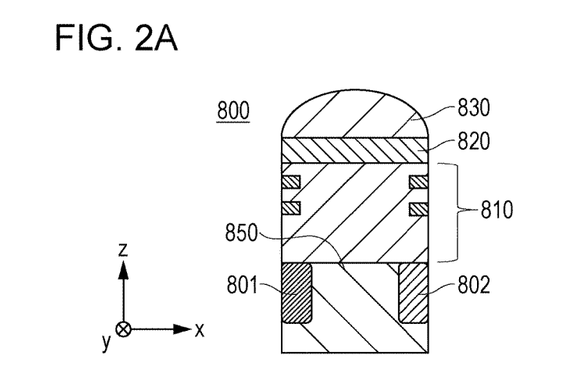
FIGS. 2A to 2D are explanatory diagrams for describing the first exemplary embodiment according to one or more aspects of the present disclosure.
Figure 2B:
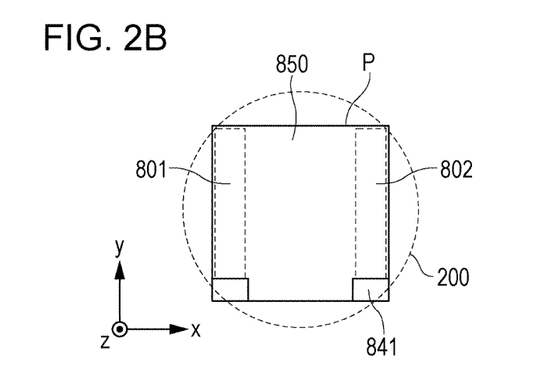

FIG. 2A is the cross sectional view of the ranging pixel 800, and FIG. 2B is the plan view of the ranging pixel 800. Part of components illustrated in the cross sectional view is omitted in the plan view, and the cross sectional view is partly illustrated more abstractly than the plan view. As illustrated in FIG. 2A, while impurity is introduced to a p-type semiconductor region 850 provided in a semiconductor substrate, the photoelectric conversion unit 801 (first photoelectric conversion unit) and the photoelectric conversion unit 802 (second photoelectric conversion unit) constituted by an n-type semiconductor region are formed. A wiring layer 810 constituted by a plurality of insulating films and conductive lines, a color filter 820, and a micro lens 830 are arranged on the semiconductor substrate.

Figure 2C:
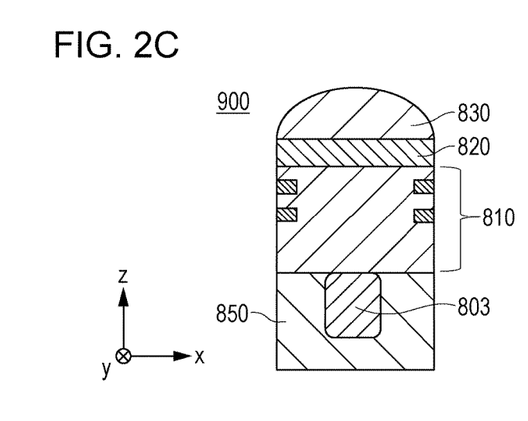

In FIGS. 2A and 2C, the p-type semiconductor region 850 may be a well formed in the semiconductor substrate. In addition, the p-type semiconductor region 850 may be a semiconductor region that is formed, after the formation of the photoelectric conversion unit 801 and the photoelectric conversion unit 802, by additionally introducing p-type impurity between the photoelectric conversion unit 801 and the photoelectric conversion unit 802.

The wiring layer 810 includes the plurality of insulating films and conductive lines. The insulating film is made, for example, of silicon oxide, BPSG, PSG, BSG, silicon nitride, silicon carbide, or the like. The conductive line is made of a conductive material such as copper, aluminum, tungsten, tantalum, titanium, or polysilicon.

The color filter 820 is a filter through which light of R (red), G (green), and B (blue) or light of C (cyan), M (magenta), and Y (yellow) transmits. The color filter 820 may also be a white filter or IR (infrared) filter through which light having wavelength of RGB or CMY transmits. In particular, in a case where ranging is performed, it is not necessary to distinguish a color, and a sensitivity is improved when the white filter is used for a pixel for the ranging. In a case where a plurality of types of the color filters 820 are used and a step is formed between the color filters, a planarization layer may be provided on the color filters 820.

The micro lens 830 is formed by using a material such as resin. A common micro lens is arranged with respect to the photoelectric conversion units 801 and 802. In addition, another micro lens is arranged with respect to the photoelectric conversion unit 803. In a case where shapes of the micro lenses appropriate to the ranging and the imaging are different from each other, the shapes of the micro lenses provided to the pixel for the ranging and the pixel for the imaging may be varied from each other.

Figure 2D:
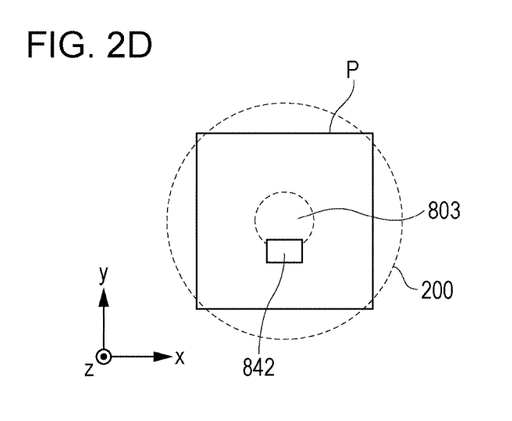

In FIGS. 2B and 2D, a gate electrode 841 of a transfer transistor having an MOS transistor structure is provided on the semiconductor substrate. The gate electrode 841 is formed of polysilicon and connected to the wiring layer 810 via a plug that is not illustrated in the drawings. The gate electrode 841 is used for transferring charges generated in the photoelectric conversion units 801 and 802 to a floating diffusion region.

As illustrated in FIG. 2B, in the plan view, the photoelectric conversion unit 801 is arranged in one end portion of a pixel P (first pixel), and the photoelectric conversion unit 802 is arranged in the other end portion of the pixel P. The photoelectric conversion unit 801 and the photoelectric conversion unit 802 are arranged so as to face each other in the x direction (first direction), and the x direction corresponds to a phase difference detection direction. Distance measurement is performed on the basis of signals obtained from the photoelectric conversion unit 801 and the photoelectric conversion unit 802. It should be noted that a region of one pixel can be defined on the basis of one opening portion constituted by the conductive line, and also, a region where one micro lens is provided can be defined as one pixel.

FIG. 2C is the cross sectional view of the imaging element 900, and FIG. 2D is the plan view of the imaging element 900. As illustrated in FIG. 2C, the photoelectric conversion unit 803 (third photoelectric conversion unit) is the n-type semiconductor region formed by introducing the impurity to the p-type semiconductor region 850.

In addition, as illustrated in FIG. 2D, the photoelectric conversion unit 803 is provided in a center portion of the pixel P (second pixel). When FIG. 2B and FIG. 2D are compared with each other, a length of the photoelectric conversion unit 803 in the y direction (second direction) corresponding to the direction orthogonal to the x direction is shorter than a length of the photoelectric conversion unit 801 and the photoelectric conversion unit 802. That is, a ratio of the length of the photoelectric conversion unit 803 with respect to a length of the second pixel P in the y direction is lower than a ratio of the length of the photoelectric conversion units 801 and 802 with respect to a length of the first pixel P. With this configuration, the pupil area corresponding to the photoelectric conversion unit 803 is arranged while being limited in the vicinity of the optical axis, so that the pupil area can be reduced.

For example, the length of the photoelectric conversion unit 803 in the y direction is one third or less of the length of the photoelectric conversion unit 801 and the photoelectric conversion unit 802. In addition, a width of the photoelectric conversion unit 803 in the x direction is shorter than a distance between the photoelectric conversion unit 801 and the photoelectric conversion unit 802. For example, the width of the photoelectric conversion unit 803 in the x direction is one third or less of a width of the pixel P, and the distance between the photoelectric conversion unit 801 and the photoelectric conversion unit 802 is one half or more of the width of the pixel P. Moreover, an area of the photoelectric conversion unit 803 is smaller than a sum of an area of the photoelectric conversion unit 801 and an area of the photoelectric conversion unit 802.

Furthermore, a width of the photoelectric conversion unit 801 and the photoelectric conversion unit 802 in the x direction is narrower than the width of the photoelectric conversion unit 803. That is, the photoelectric conversion unit 801 and the photoelectric conversion unit 802 have a configuration of being edged up to both ends of the pixel. With this configuration, the distance between the centroids of the pupil areas corresponding to the photoelectric conversion unit 801 and the photoelectric conversion unit 802 can be widened. For example, the width of the photoelectric conversion unit 801 and the photoelectric conversion unit 802 in the x direction is one quarter or less of the width of the pixel P.

It should be noted that the "second pixel" mentioned above refers to a pixel where the photoelectric conversion unit 803 is provided. That is, when the photoelectric conversion units 801, 802, and 803 are provided so as to correspond to one micro lens, the first pixel and the second pixel may be the same pixel.

FIGS. 2B and 2D illustrate an outer edge 200 of the micro lens 830. A relationship between the micro lens and the respective photoelectric conversion units will be described with reference to FIG. 3.

Figure 3:
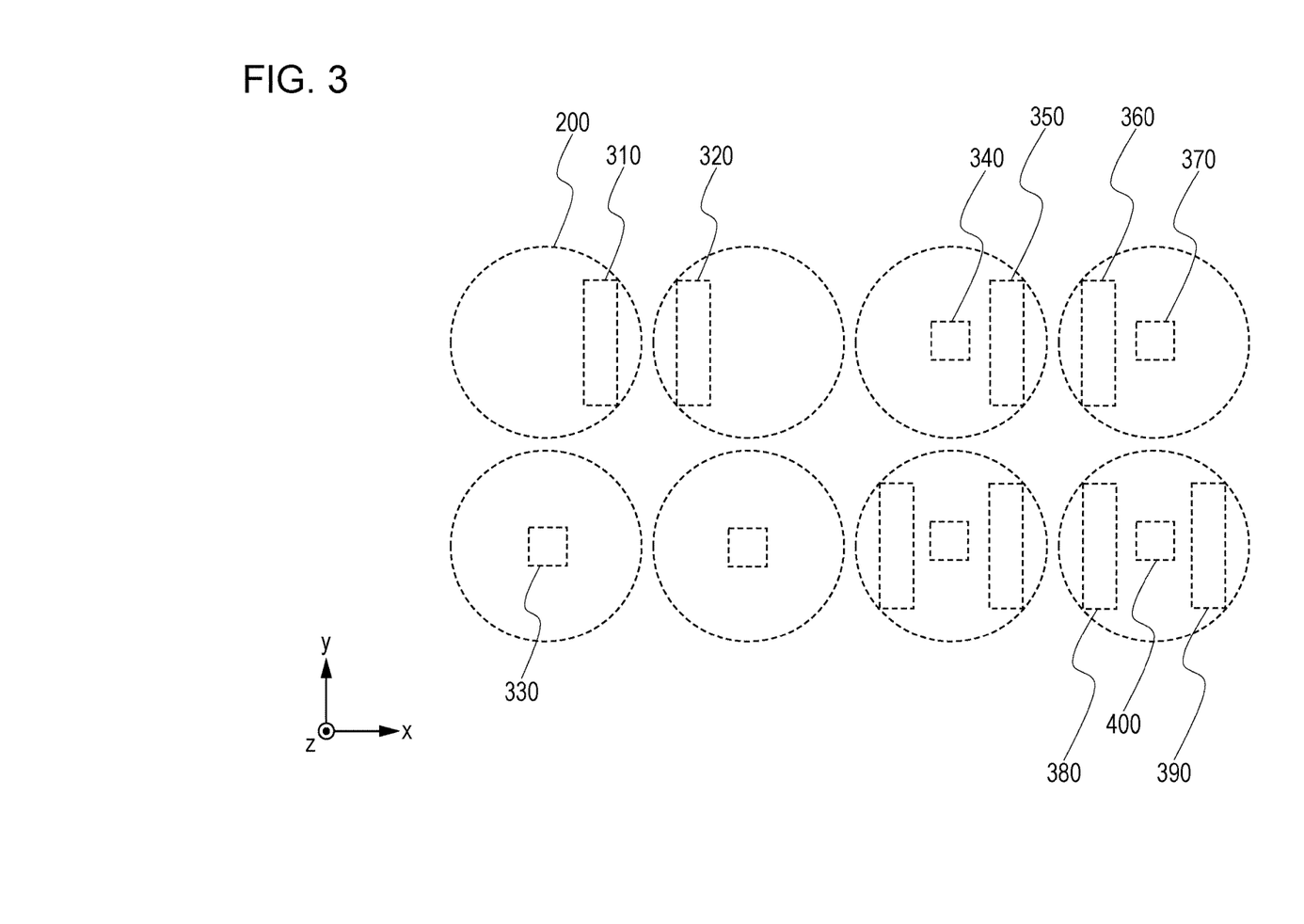
FIG. 3 is an explanatory diagram for describing the first exemplary embodiment according to one or more aspects of the present disclosure.

FIG. 3 schematically illustrates the micro lenses arranged in the pixel region 121. The plurality of micro lenses are one-dimensionally arranged in the x direction (first direction). This structure is referred to as a micro lens group. While the plurality of micro lenses groups are arranged along the y direction (second direction) orthogonal to the first direction, the plurality of micro lenses are two-dimensionally arranged. This structure is referred to as a micro lens array. Each of the plurality of micro lenses has the outer edge 200. In addition, each of the plurality of micro lenses has a center. Moreover, these micro lenses have a first end portion and a second end portion arranged in the x direction while the center is put in between the first end portion and the second end portion. A plurality of photoelectric conversion units are arranged so as to be overlapped with one another in the plan view on the plurality of micro lenses. For example, in FIG. 3, an element 320, an element 360, and an element 380 schematically illustrate the first photoelectric conversion unit arranged so as to overlap the first end portion of the micro lens. In addition, an element 310, an element 350, and an element 390 schematically illustrate the second photoelectric conversion unit arranged so as to overlap the second end portion of the micro lens. Furthermore, an element 330, an element 340, an element 370, and an element 400 schematically illustrate the third photoelectric conversion unit arranged so as to overlap the center of the micro lens. In this manner, at least one of the first photoelectric conversion unit, the second photoelectric conversion unit, and the third photoelectric conversion unit is arranged in the respective micro lenses while corresponding to the respective positions of the micro lenses.

Although only the transfer transistor has been described above, other pixel transistors are appropriately arranged in the pixel region 121. The pixel transistor may adopt various circuit arrangements and includes, for example, an amplification transistor configured to amplify a signal of the photoelectric conversion unit and a reset transistor configured to reset a signal transferred to the amplification transistor. For example, as illustrated in FIG. 2D, with regard to the imaging pixel where the photoelectric conversion unit is arranged only in the center portion, the pixel transistor may be arranged in a region overlapped with the micro lens of the imaging pixel corresponding to a region where the photoelectric conversion unit is not arranged. In addition, as illustrated in FIG. 2B, with regard to the ranging pixel where the photoelectric conversion units are arranged only in the end portions, the pixel transistor may be arranged in a region overlapped with the micro lens of the ranging pixel corresponding to a region where the photoelectric conversion unit is not arranged. The pixel transistor of the ranging pixel may be arranged in a position overlapped with the micro lens of the imaging pixel, or inversely, the pixel transistor of the imaging pixel may be arranged in a position overlapped with the micro lens of the ranging pixel. In addition, the pixel transistor may be commonly used by the imaging pixel and the ranging pixel.

According to the configuration described above, it is possible to provide the imaging sensor in which both the high ranging accuracy and the deep depth of field can be achieved.

Modified Example of the First Exemplary Embodiment

Figure 4A:
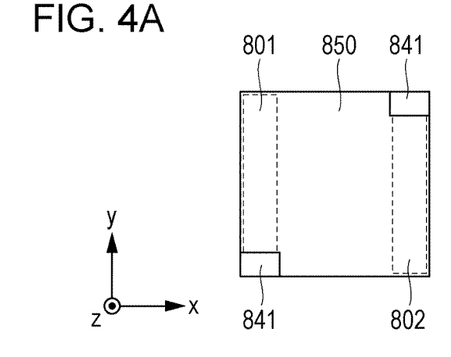
FIGS. 4A to 4D are explanatory diagrams for describing the first exemplary embodiment according to one or more aspects of the present disclosure.
Figure 4B:
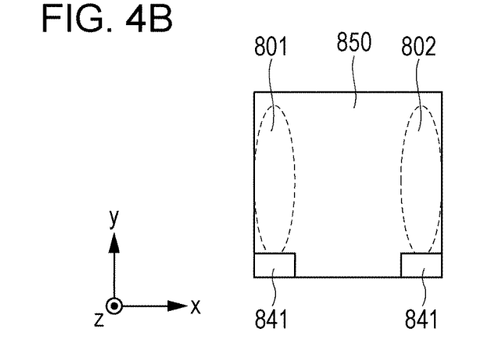
Figure 4C:
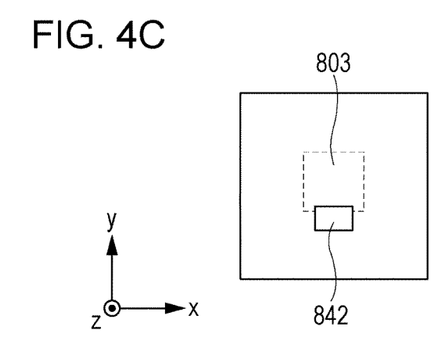
Figure 4D:
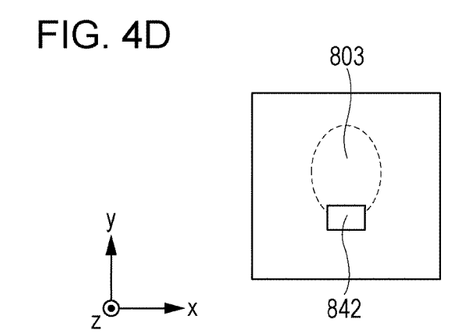

FIGS. 4A to 4D illustrate a modified example according to one or more aspects of the present disclosure. FIGS. 4A and 4B are plan views of the ranging pixel 800, and FIGS. 4C and 4D are plan views of the imaging element 900. The mutual gate electrodes 841 illustrated in FIG. 2B are arranged in symmetric positions with respect to an axis in parallel with the y direction, but the mutual gate electrodes 841 illustrated in FIG. 4A are not arranged in the symmetric positions with respect to the axis in parallel with the y direction. In other words, in FIG. 4A, the two gate electrodes 841 are arranged in facing corner portions of the pixel P.

In addition, as illustrated in FIG. 4B, shapes of the photoelectric conversion units 801 and 802 of the ranging pixel 800 do not necessarily need to be rectangular and may also be elliptical.

Moreover, a shape of the photoelectric conversion unit 803 of the imaging element 900 may be rectangular as illustrated in FIG. 4C or may be elliptical as illustrated in FIG. 4D. Furthermore, the photoelectric conversion unit 803 may have a shape of not only a quadrangle but also other polygons such as a pentagon and an octagon.

Second Exemplary Embodiment

Figure 5:
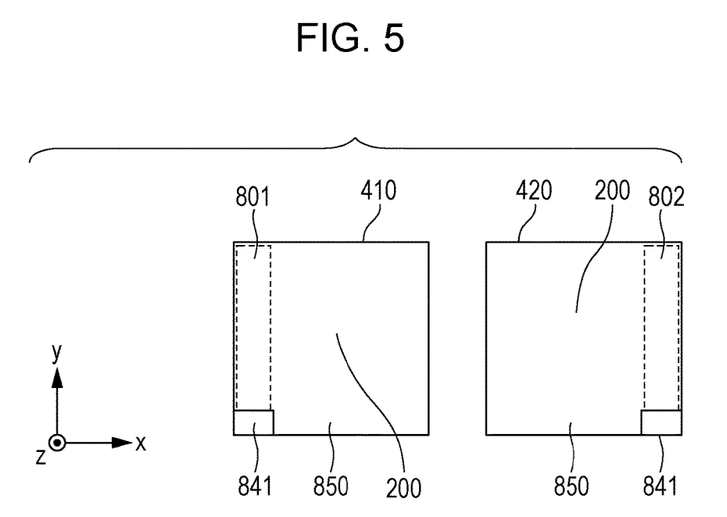
FIG. 5 is an explanatory diagram for describing a second exemplary embodiment according to one or more aspects of the present disclosure.

FIG. 5 illustrates configuration examples of a first pixel 410 and a second pixel 420 corresponding to the ranging pixel. A first micro lens (not illustrated) is provided to the first pixel 410, and a second micro lens (not illustrated) is provided to the second pixel 420. According to the first exemplary embodiment, one ranging pixel includes the two photoelectric conversion units, but as illustrated in FIG. 5, a configuration may also be adopted in which the first pixel 410 and the second pixel 420 include one photoelectric conversion unit each.

Third Exemplary Embodiment

Figure 6A:
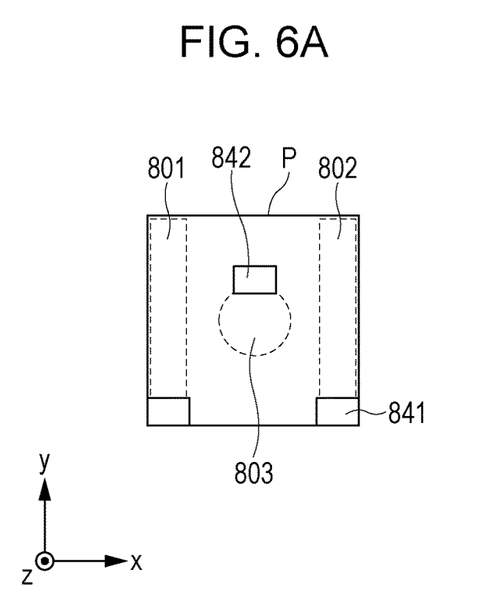
FIGS. 6A and 6B are explanatory diagrams for describing a third exemplary embodiment according to one or more aspects of the present disclosure.
Figure 6B:
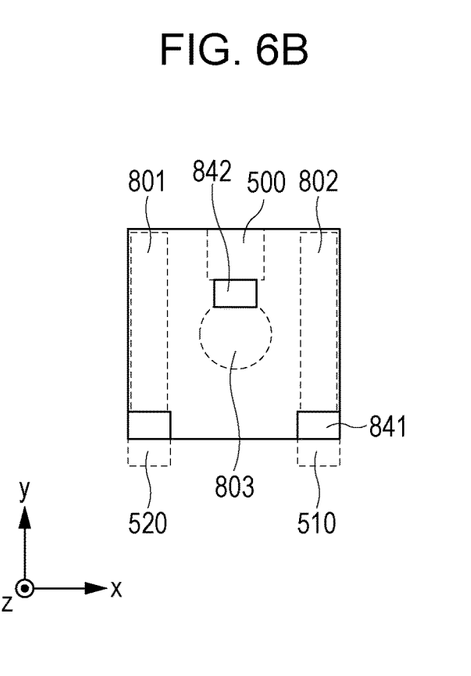

FIG. 6A illustrates a mode in which all the photoelectric conversion units 801 and 802 for the ranging and the photoelectric conversion unit 803 for the imaging are arranged in the pixel P. According to the first and second exemplary embodiments, the ranging pixel and the imaging pixel are different pixels, and the photoelectric conversion unit is not arranged in the center portion of the ranging pixel. However, as in the present exemplary embodiment, the configuration for the ranging and the configuration for the imaging can also be provided in one pixel. In addition, in FIG. 6A, the gate electrodes 841 of the transfer transistors configured to transfer the charges from the photoelectric conversion units 801 and 802 and a gate electrode 842 of the transfer transistor configured to transfer the charges from the photoelectric conversion unit 803 are arranged while being separated into an upper portion and a lower portion of the pixel P. FIG. 6B illustrates a more detailed structure of the structure illustrated in FIG. 6A, and floating diffusion regions 500, 510, and 520 corresponding to n-type semiconductor regions are arranged. A contact plug is arranged in the floating diffusion region, and a driving line for driving the transistor is also arranged in each gate electrode. If the gate electrodes 841 and 842 are arranged in only one of the lower portion and the upper portion, the driving lines and the like are closely spaced, and a wiring layout may be restricted in some cases. According to the present exemplary embodiment, a merit is attained that a wiring layout with a high degree of freedom can be realized.

Other Exemplary Embodiment

According to the above-described exemplary embodiments, the front-side illuminated imaging sensor has been described as an example, but the exemplary embodiments according to one or more aspects of the present disclosure can also be applied to a back-side illuminated imaging sensor.

Exemplary Embodiments of an Imaging System

The present exemplary embodiment according to one or more aspects of the present disclosure relates to an imaging system using the imaging sensor including the ranging pixel and the imaging pixel described according to the above-described exemplary embodiments. For example, an in-vehicle camera is used as the imaging system.

Figure 10:
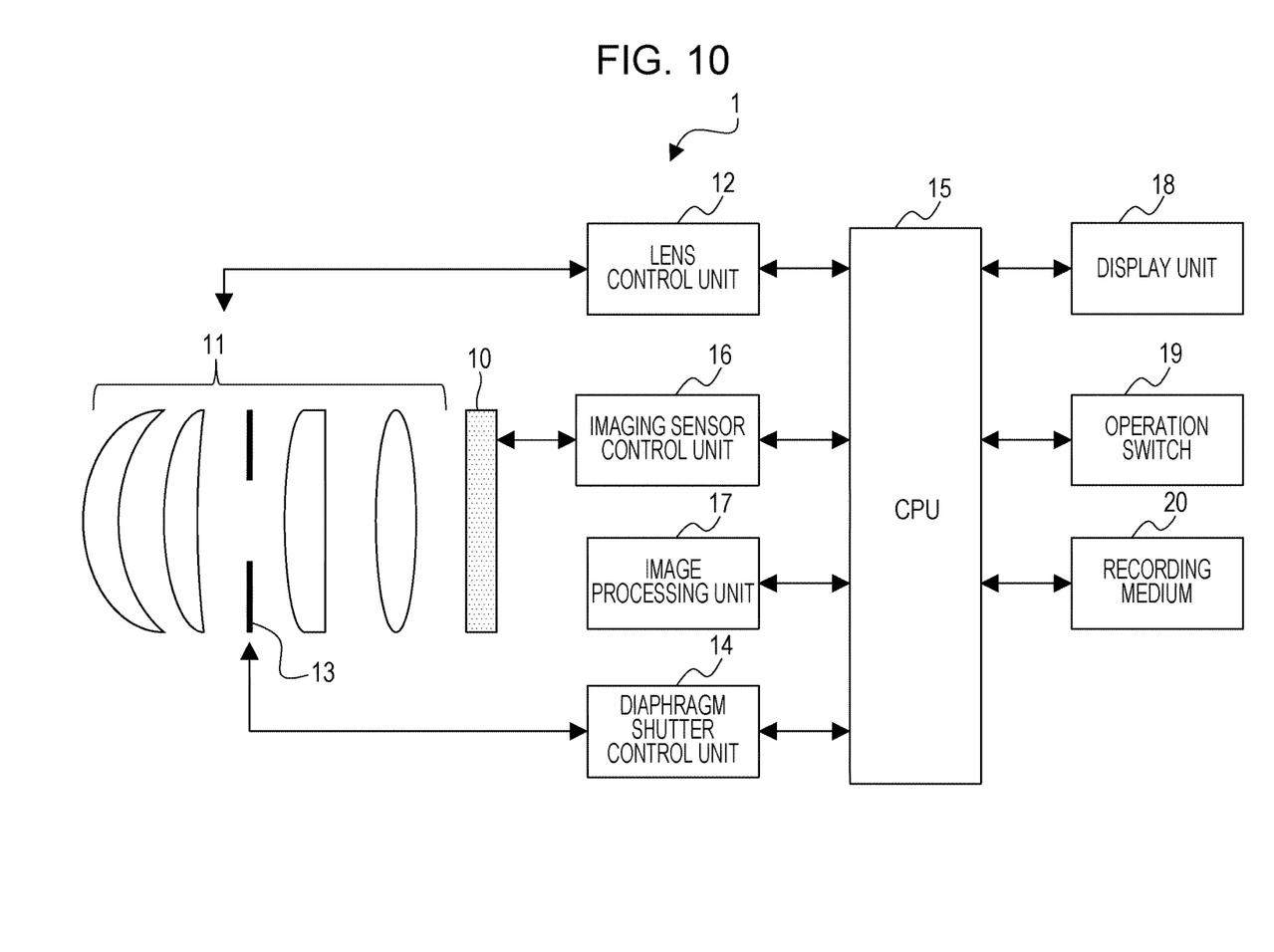
FIG. 10 is an explanatory diagram for describing another exemplary embodiment according to one or more aspects of the present disclosure.

FIG. 10 illustrates a configuration of an imaging system 1. An imaging lens corresponding to an imaging optical system 11 is mounted to the imaging system 1. The imaging optical system 11 controls a focus position by a lens control unit 12. A diaphragm 13 is connected to a diaphragm shutter control unit 14 and performs light amount adjustment by changing an opening diameter of the diaphragm. An imaging plane of an imaging sensor 10 is arranged in an image space of the imaging optical system 11 to obtain an object image formed by the imaging optical system 11. A CPU 15, which may include one or more processors and one or more memories, is a controller and governs control of various operations of the camera. The CPU 15 includes a calculation unit, a read only memory (ROM), a random access memory (RAM), an analog-to-digital (A/D) converter, a digital-to-analog (D/A) converter, a communication interface circuit, and the like. The CPU 15 controls operations of the respective units in the camera in accordance with a computer program stored in the ROM and executes a series of imaging operations such as measurement of a distance to the object, autofocus (AF) including detection of a focus state of an imaging optical system (focus detection), imaging, image processing, and recording. The CPU 15 is equivalent to a signal processing unit. An imaging sensor control unit 16 controls the operation of the imaging sensor 10 and also transmits pixel signals (imaging signals) output from the imaging sensor 10 to the CPU 15. An image processing unit 17 generates image signals by performing image processing such as γ conversion or color interpolation on the imaging signals. The image signals are output to a display unit 18 such as a liquid crystal display (LCD). The CPU 15 is operated by an operation switch 19, and a picked-up image is recorded in a detachable recording medium 20.

Exemplary Embodiment of an in-Vehicle Imaging System

Figure 11A:
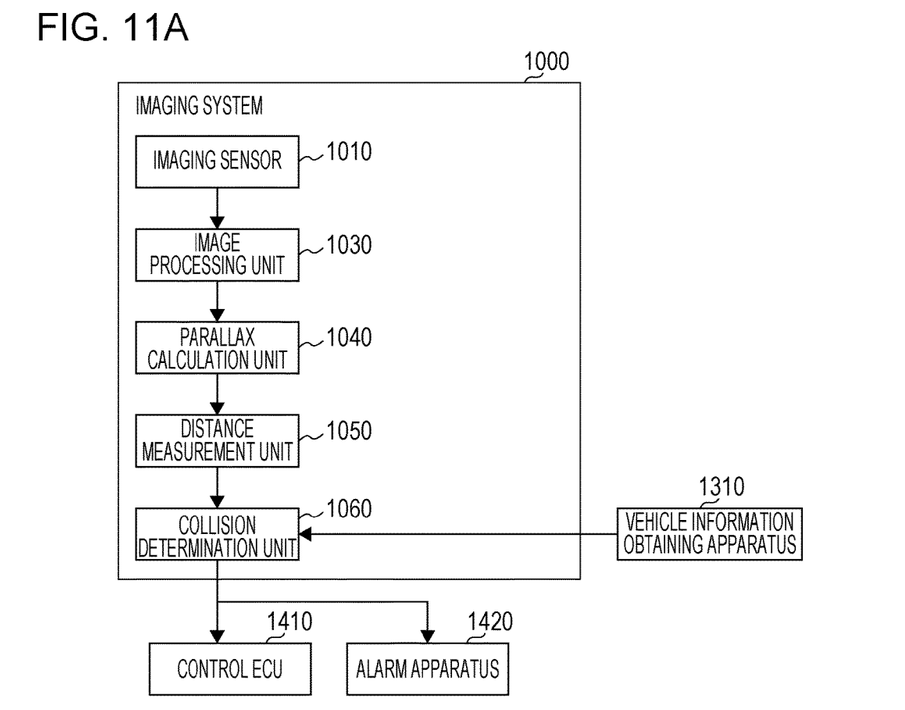
FIGS. 11A and 11B are explanatory diagrams for describing another exemplary embodiment according to one or more aspects of the present disclosure.
Figure 11B:
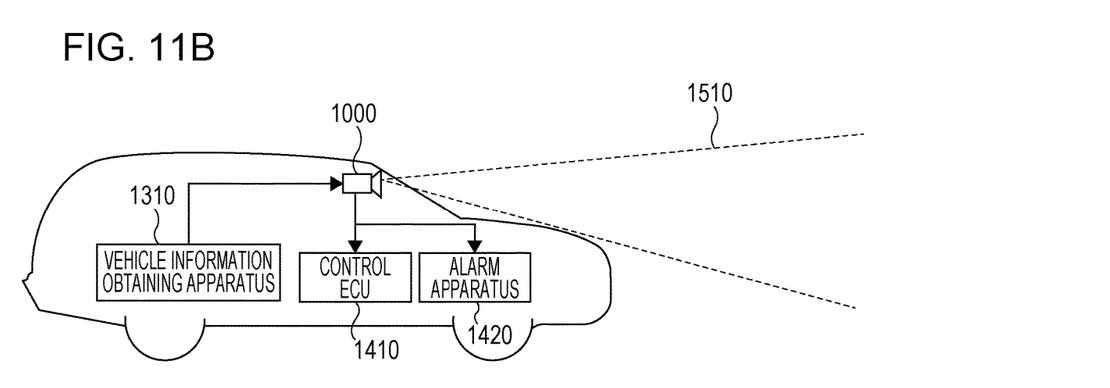

FIGS. 11A and 11B illustrate an example of an imaging system related to an in-vehicle camera. An imaging system 1000 includes ranging pixels and imaging pixels according to one or more aspects of the present disclosure. The imaging system 1000 includes an image processing unit 1030 configured to perform image processing on plural pieces of image data obtained by an imaging sensor 1010 and a parallax calculation unit 1040 configured to calculate a parallax (phase difference of the parallax images) on the basis of the plural pieces of image data obtained by the imaging system 1000. In addition, the imaging system 1000 includes a distance measurement unit 1050 configured to calculate a distance to a target object on the basis of the calculated parallax and a collision determination unit 1060 configured to determine whether or not a collision probability exists on the basis of the calculated distance. Herein, the parallax calculation unit 1040 and the distance measurement unit 1050 are examples of a distance information obtaining unit configured to obtain distance information to the target object. That is, the distance information refers to information on the parallax, the de-ranging amount, the distance to the target object, or the like. The collision determination unit 1060 may determine the collision probability by using any of these pieces of distance information. The distance information obtaining unit may be realized by dedicatedly designed hardware or may also be realized by software module. In addition, the distance information obtaining unit may be realized by a field programmable gate array (FPGA), an application specific integrated circuit (ASIC), or the like or may also be realized by any combination of these elements.

The imaging system 1000 is connected to a vehicle information obtaining apparatus 1310 and can obtain vehicle information such as a vehicle speed, a yaw rate, or a rudder angle. A control electronic control unit (ECU) 1410 corresponding to a control apparatus configured to output a control signal for generating braking force to the vehicle on the basis of the determination result in the collision determination unit 1060 is also connected to the imaging system 1000. An alarm apparatus 1420 configured to issue a warning to a driver on the basis of the determination result in the collision determination unit 1060 is also connected to the imaging system 1000. For example, in a case where the collision probability is high as the determination result in the collision determination unit 1060, the control ECU 1410 performs vehicle control to avoid a collision or alleviate damage by applying a brake, releasing an accelerator, suppressing an engine output, or the like. The alarm apparatus 1420 issues a warning to a user by sounding an alarm such as sound, displaying warning information on a screen such as a car navigation system, vibrating a seat belt or steering, or the like.

According to one or more aspects of the present disclosure, a surrounding of the vehicle such as, for example, a forward area or a backward area is imaged by the imaging system 1000. FIG. 11B illustrates the imaging system in a case where the forward area of the vehicle is imaged. In addition, the example of the control for avoiding the collision with the other vehicle has been described above, but the present exemplary embodiment can also be applied to control for following the other vehicle to perform automated driving, control for the automated driving without drifting from a lane, or the like. Furthermore, the imaging system can be applied to not only the vehicle such as an automobile but also a moving body (moving apparatus) such as, for example, a vessel, aircraft, or industrial robot. In addition, the imaging system can be widely applied to not only the moving body but also a device using object recognition such as an intelligent transport system (ITS).

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-042680 filed Mar. 4, 2016, which is hereby incorporated by reference herein in its entirety.

What is claimed is:

1. An imaging sensor comprising:
a plurality of pixels two-dimensionally arranged on a substrate;
a first photoelectric conversion unit arranged in one end portion of a first pixel;
a second photoelectric conversion unit that faces the first photoelectric conversion unit in a first direction and that is arranged in the other end portion of the first pixel; and
a third photoelectric conversion unit arranged in a center portion of a second pixel,
wherein a ratio of a length of the third photoelectric conversion unit with respect to a length of the second pixel in a second direction corresponding to a direction orthogonal to the first direction is lower than a ratio of a length of the first photoelectric conversion unit and the second photoelectric conversion unit with respect to a length of the first pixel in the second direction.

2. The imaging sensor according to claim 1, wherein a width of the first photoelectric conversion unit and the second photoelectric conversion unit in the first direction is narrower than a width of the third photoelectric conversion unit.

3. The imaging sensor according to claim 1, wherein a micro lens provided to the first pixel and a micro lens provided to the second pixel are different micro lenses.

4. The imaging sensor according to claim 1, wherein a common micro lens is provided to the first pixel and the second pixel.

5. The imaging sensor according to claim 4, wherein the first pixel and the second pixel are the same pixel.

6. The imaging sensor according to claim 1, wherein the first pixel is a pixel used for performing ranging, and the second pixel is a pixel used for performing imaging.

7. The imaging sensor according to claim 1, wherein the first photoelectric conversion unit, the second photoelectric conversion unit, and the third photoelectric conversion unit have a semiconductor region of a first conductivity type.

8. The imaging sensor according to claim 1, wherein an area of the third photoelectric conversion unit is smaller than a sum of an area of the first photoelectric conversion unit and an area of the second photoelectric conversion unit.

9. The imaging sensor according to claim 1, wherein a length of the third photoelectric conversion unit in the second direction is one third or less of a length of the first photoelectric conversion unit and the second photoelectric conversion unit.

10. The imaging sensor according to claim 1, wherein a width of the first photoelectric conversion unit and a width of the second photoelectric conversion unit in the first direction is one quarter or less of a width of the first pixel.

11. The imaging sensor according to claim 4, further comprising:
a gate electrode of a first transfer transistor configured to transfer charges generated in the first photoelectric conversion unit;
a gate electrode of a second transfer transistor configured to transfer charges generated in the second photoelectric conversion unit; and
a gate electrode of a third transfer transistor configured to transfer charges generated in the third photoelectric conversion unit,
wherein the gate electrode of the third transfer transistor is arranged between the gate electrode of the first transfer transistor and the gate electrode of the second transfer transistor in the first direction, and the third photoelectric conversion unit is arranged between the gate electrode of the third transfer transistor and the gate electrode of the first transfer transistor in the second direction.

12. An imaging sensor comprising:
a micro lens array in which a plurality of micro lens group constituted by a plurality of micro lenses arranged along a first direction are arranged along a second direction orthogonal to the first direction; and
a plurality of photoelectric conversion units arranged so as to overlap the plurality of respective micro lenses in a plan view, the micro lens including
a first end portion and
a second end portion arranged in a manner that a center of the micro lens is put in between the first end portion and the second end portion in the first direction, and
the plurality of photoelectric conversion units including
a first photoelectric conversion unit arranged so as to overlap the first end portion,
a second photoelectric conversion unit arranged so as to overlap the second end portion, and
a third photoelectric conversion unit arranged so as to overlap the center of the micro lens,
wherein a length of the third photoelectric conversion unit in the second direction is shorter than a length of the first photoelectric conversion unit and the second photoelectric conversion unit.

13. A moving body comprising:
an imaging sensor comprising:
   a plurality of pixels two-dimensionally arranged on a substrate;
   a first photoelectric conversion unit arranged in one end portion of a first pixel;
   a second photoelectric conversion unit that faces the first photoelectric conversion unit in a first direction and that is arranged in the other end portion of the first pixel; and
   a third photoelectric conversion unit arranged in a center portion of a second pixel,
   wherein a ratio of a length of the third photoelectric conversion unit with respect to a length of the second pixel in a second direction corresponding to a direction orthogonal to the first direction is lower than a ratio of a length of the first photoelectric conversion unit and the second photoelectric conversion unit with respect to a length of the first pixel in the second direction;
a distance information obtaining unit configured to obtain distance information to a target object on a basis of a parallax image based on a signal from the imaging sensor; and
a control unit configured to control the moving body on a basis of the distance information.

* * * * *